United States Patent
Xu et al.

(10) Patent No.: US 10,469,202 B2
(45) Date of Patent: Nov. 5, 2019

(54) FEC MECHANISM BASED ON MEDIA CONTENT

(71) Applicant: SHANGHAI JIAO TONG UNIVERSITY, Shanghai (CN)

(72) Inventors: Yiling Xu, Shanghai (CN); Wenjun Zhang, Shanghai (CN); Jun Sun, Shanghai (CN); Xuguo Tang, Shanghai (CN); Wei Huang, Shanghai (CN); Bo Li, Shanghai (CN); Yunfeng Guan, Shanghai (CN); Ning Liu, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 239 days.

(21) Appl. No.: 15/542,079

(22) PCT Filed: Jan. 8, 2016

(86) PCT No.: PCT/CN2016/070525
§ 371 (c)(1),
(2) Date: Oct. 13, 2017

(87) PCT Pub. No.: WO2016/110275
PCT Pub. Date: Jul. 14, 2016

(65) Prior Publication Data
US 2018/0069654 A1 Mar. 8, 2018

(30) Foreign Application Priority Data

Jan. 8, 2015 (CN) .......................... 2015 1 0010097
Feb. 13, 2015 (CN) .......................... 2015 1 0080576

(Continued)

(51) Int. Cl.
H03M 13/00 (2006.01)
H04L 1/00 (2006.01)
G06F 16/35 (2019.01)

(52) U.S. Cl.
CPC ............ H04L 1/007 (2013.01); H04L 1/0009 (2013.01); H04L 1/0017 (2013.01);
(Continued)

(58) Field of Classification Search
CPC ............... H03M 13/11; H03M 13/611; H03M 13/6362; H03M 13/616; H03M 13/13;
(Continued)

(56) References Cited

U.S. PATENT DOCUMENTS

2009/0080510 A1* 3/2009 Wiegand ............... H03M 13/03
375/240.01
2009/0201988 A1* 8/2009 Gazier ................. H04N 21/222
375/240.06

(Continued)

*Primary Examiner* — Guerrier Merant

(57) ABSTRACT

The invention provides an FEC (Forward error correction) mechanism based on media content. The mechanism classifies the media content, and endows it with different importance, and then changes the coding scheme according to the packets belonging to frames of different importance in combination with channel conditions and user experience, to conduct protection according to the importance of corresponding frames. By using the technical scheme of the invention, for the data congestion caused by excessive coding in the current FEC system, the media content is able to be classified and endowed with different importance, and controlled by signaling and indicating bit; different FEC coding strengths is able to be adopted; the duplication-expanding window fountain code with the unequal error protection performance is able to be further adopted, to achieve the maximum guarantee of media content quality and reduce the large amount of data caused by FEC.

5 Claims, 9 Drawing Sheets

(30) Foreign Application Priority Data

Oct. 16, 2015 (CN) .......................... 2015 1 0673091
Oct. 16, 2015 (CN) .......................... 2015 1 0673115

(52) U.S. Cl.
CPC .......... *H04L 1/0057* (2013.01); *H04L 1/0076* (2013.01); *G06F 16/35* (2019.01); *H04L 1/0048* (2013.01)

(58) Field of Classification Search
CPC .......... H03M 13/1111; H03M 13/1191; H03M 13/353; H04L 1/0009; H04L 1/0041; H04L 1/0043; H04L 1/0061; H04L 1/0063; H04L 1/0057; H04L 1/007; H04L 1/0017; H04L 1/0076; H04L 1/0048; H04B 1/123; H04B 7/0413; G06F 16/35
See application file for complete search history.

(56) References Cited

U.S. PATENT DOCUMENTS

| | | | |
|---|---|---|---|
| 2012/0182860 A1* | 7/2012 | Liu .................... | H04L 12/1863 370/216 |
| 2012/0207224 A1* | 8/2012 | Chow ................ | H03M 13/1111 375/240.25 |
| 2014/0281823 A1* | 9/2014 | Micheloni .......... | G06F 11/1012 714/773 |
| 2016/0204811 A1* | 7/2016 | Goela .................. | H04B 1/123 375/260 |
| 2016/0301582 A1* | 10/2016 | Arndt ...................... | H04L 43/04 |
| 2018/0076929 A1* | 3/2018 | Zhang ................... | H03M 13/11 |

* cited by examiner

FEC MECHANISM BASED ON MEDIA CONTENT

CROSS REFERENCE OF RELATED APPLICATION

This is a U.S. National Stage under 35 U.S.C 371 of the International Application PCT/CN2016/070525, filed Jan. 8, 2016, which claims priority under 35 U.S.C. 119(a-d) to CN 201510010097.9, filed Jan. 8, 2015; CN 201510080576.8, filed Feb. 13, 2015; CN 201510673115.1, filed Oct. 16, 2015; and CN 201510673091.X, filed Oct. 16, 2015.

BACKGROUND OF THE PRESENT INVENTION

Field of Invention

The invention relates to the technical field of multimedia transmission, and more particularly to a forward error correction (FEC) mechanism based on media content.

Description of Related Arts

In the media service system of heterogeneous network, the content is distributed to the terminal through the Internet protocol or the broadcast protocol. The media data is transmitted in the Internet by using IP/TCP or UDP messages; the broadcast transmits the content through MPEG2-TS. UDP messages may be lost after passing through multiple network devices. Broadcast TS streams may cause errors due to the transmission environment, thereby resulting in picture damage or sound pauses at the terminal side.

The forward error correction (FEC) technology is a coding technology widely used in the communication system. The error-correction coding of media data is performed by the server side; the redundant information is sent together; the reverse FEC decoding is performed at the terminal side, to restore the lost messages. The typical block code is taken as an example; the basic principle is as follows: at the sending end, the kbit information is encoded as a block; the redundancy check information of (n–k) bit is added to form a code with a length of n bit. After the code reaches the receiving end through the channel, if the error is within the correctable range, the error bit is able to be checked and corrected by decoding, so as to resist the interference caused by the channel, effectively reduce the bit error rate of the system, and improve the reliability of communication system.

However, the FEC processing reduces the bit error rate of the system with the redundancy overhead cost; excessive FEC encoding may also stress the real time of system and network status.

In the ISO-23008-1/10/13 standard, the traditional FEC structure encodes all information uniformly and does not distinct the user information, which is unsuitable for hybrid content or hybrid network distribution. Therefore, a two-tier structure is proposed. The two-tier structure is as shown in FIG. 1.

In the first layer, the source packet block is divided into many small blocks, which are FEC-protected separately; the second layer is a whole block, which is FEC-protected. The first layer is finely divided to provide a small delay; the second layer ensures the recovery performance and small redundancy.

For hybrid content transmission, the content may be divided into timed and non-timed; therefore, the two-tier structure is able to be used. The timing content adopts the mode 1 to ensure the delay; the non-timing content adopts the mode 1 and mode 2 at the same time, to ensure the accuracy.

For users in different performance channels, the users with good channel performance only need FEC1 to ensure the delay and power consumption; the users with poor channel performance need to perform FEC1 and FEC2 at the same time, to ensure the accuracy.

The solution solves the problem to a certain extent. For the users (GroupB) with poor channel performance, the two-tier structure does improve recovery performance, but introduces a great delay. For the users (GroupA) with better channel performance, it is not necessary to perform FEC1; the smaller the packet is, the smaller the delay is. The unequal importance of information is not considered. The information or users may be classified according to the two-tier structure; for the specific strategy of splitting big block into small blocks, it is a complex problem.

At the same time, the unequal error protection (UEP) is a kind of joint source channel coding. The core idea is to adopt different channel protection mechanisms for each part of data according to different importance of each data of the code stream; that is, the important code stream is specially protected. Although UEP reduces the anti-noise performance of non-critical code streams, the UEP helps to improving the overall performance of anti-BER (bit error rate) of the system.

As a forward error correction (FEC) technology, the digital fountain code does not require feedback and automatic retransmission mechanism in the transmission process, which avoids the return delay of the signal and the feedback explosion in broadcast applications. The basic idea of the digital fountain is as follows: the original data is divided into k data symbols by the sending end; these data symbols are encoded, to output an encoded symbol code stream of arbitrary length; the receiving end only needs to correctly receive n (n is slightly greater than k) encoded symbols, thereby restoring all k data symbols with a great probability.

The digital fountain code obtains UEP performance, which is able to protect data of different importance. Compared with the traditional channel coding method at a constant bit rate, the digital fountain code has the following obvious advantages.

1. Ideal scalability. Since unidirectional broadcasts have no feedback, the sender is not affected by the increase in the number of users. Therefore, the sender is able to provide services for any number of users.

2. Adapting to time-varying channel, and efficient use of channel capacity. The decoding performance of the user is independent of the channel deletion probability and bandwidth. When the packet loss rate of the channel is high and the condition is bad, the decoding at the receiving end. will not be affected; that is, the receiving end is able to conduct normal decoding after receiving a sufficient number of encoded data, with greater adaptability.

3. Low encoding and decoding complexities. Ideally, the generation of each encoded symbol by the fountain code has linear encoding and decoding complexities, which facilitates simplifying the design and software implementation of encoder and decoder at the transceiver.

4. Good applicable performance of heterogeneous users. The BER characteristic of the fountain code enables the users with different packet loss rate or bandwidth not to affect each other, so that high-quality users are not restricted by inferior users. In addition, the digital fountain code is able to support intermittent transmission, asynchronous access and other service modes.

SUMMARY OF THE PRESENT INVENTION

In view of the defects in the prior art, an object of the invention is to provide an FEC mechanism based on media content, thereby solving the problems in the current FEC system that the accuracy is poor when the real time is good, the real time is poor when the accuracy is good, as well as the data congestion caused by excessive FEC coding.

To achieve the above purpose, the invention adopts the following technical scheme:

An FEC mechanism based on media content, wherein the FEC mechanism is implemented by using any of the following four methods:

Method I: classifying the media content, and endowing it with different importance, and then changing the coding scheme according to the packets belonging to frames of different importance in combination with channel conditions and user experience, to conduct protection according to the importance of corresponding frames;

Method II: classifying the media content, and endowing it with different importance; in the absence of shunting the original media data flow, transmitting the data packets to the corresponding FEC encoder according to the importance of frames contained in the media packet in combination with channel conditions and user experience, to conduct different degrees of protection;

Method III: classifying the media content, and endowing it with different importance; in the absence of shunting the original media data flow, dynamically adjusting the importance of frames contained in the media packet and the corresponding coding scheme according to the current channel condition; transmitting the data packets to the corresponding FEC encoder to conduct different degrees of protection; finally, one source data flow will only be encoded as an FEC code stream;

Method IV: classifying the media content, and endowing it with different importance; in combination with channel conditions and user experience, protecting data of different importance by using the digital fountain code with the unequal error protection performance.

Further, the four methods comprise steps of adding unequal error protection flag bit in the signaling information transmitted together with the media processing unit (MPU), and adding special instruction fields to form more personalized protection schemes.

Further, Method I to Method III: classifying the media content and endowing it with different importance; then controlling by signaling and indicating bit; coding by using different FEC coding strengths.

Further, Method IV: classifying the media content and endowing it with different importance; then controlling by signaling and indicating bit; using the duplication-expanding window fountain code with the unequal error protection (UEP) performance.

Further, Method I: for the architecture of MMT AL-FEC sending end, the flow method of the sending end comprises steps of:

a) Generating MMTP flows and signaling by the server based on media resources;

b) Analyzing the importance of each frame in the media resources;

distributing these MMT loads to different original data flows, and transmitting to corresponding FEC mechanisms for protection;

c) After FEC coding is completed, returning the corresponding repair characters, the FEC data load identification and the original data load identification; and d) Packaging all repair characters into an FEC repair packet and sending to the transport layer.

Further, Method I comprises a step of identifying FEC flows, the FEC coding structure used and FEC code by the signaling; to support the mechanism, the FEC_FLOW_DESCRIPTOR field in the signaling is modified: the original signaling only supports the repair information of one FEC flow multiplexing multiple media resources; the parts with different importance of one media resource is added now; FEC signaling is respectively controlled to refine the FEC mechanism; the server is able to dynamically adjust the FEC strength of different parts of the media resource according to the user network status, to achieve a balance point between the network bandwidth and user experience.

Further, Method II: for the architecture of MMT AL-FEC sending end, the flow method of the sending end comprises steps of:

a) Generating MMTP flows and signaling by the server based on media resources;

b) Analyzing the importance of each frame in the media resources; transmitting MMT packets to different FEC encoders; using the corresponding FEC mechanism to generate corresponding FEC codes;

c) After FEC coding is completed, returning the corresponding repair characters, the FEC data load identification and the original data load identification; and d) Packaging all repair characters into an FEC repair packet and sending to the transport layer.

Further, Method II comprises a step of identifying FEC flows, the FEC coding structure used and FEC code by the signaling; to support the mechanism, the fec_flow_descriptor field in the signaling is modified: the original signaling only supports the repair information of one FEC flow multiplexing multiple media resources; the parts with different importance of one media resource is added now; the modified signaling respectively controls FEC coding based on the parts with different importance of one media resource, to achieve different FEC flows and refine the FEC mechanism; the server is able to dynamically adjust the FEC strength of different parts of the media resource according to the user network status; after receiving the signaling, the receiving end restores the media resource according to corresponding instructions, to achieve a balance point between the network bandwidth and user experience.

Further, the fec_flow_descriptor field in the signaling is modified: a new fec_coding_structure is added based on the current three kinds of fec_coding_structure fields in the AL-FEC message; the function of the fec_coding_structure is to describe the currently used FEC coding scheme, including the selected coding algorithm, whether to use the private coding scheme, the maximum protection time window time and value, etc.; the field is located in the AL-FEC signaling and is transmitted to the receiving end; the flag bit of the newly added fec_coding_structure is selected within the range of the existing reserved.

Further, Method III: for the architecture of MMT AL-FEC sending end, the flow method of the sending end comprises steps of:

a) Generating MMTP flows and signaling by the server based on media resources;

b) According to different importance of each frame of data in MMT flows, transmitting MMT packets to different FEC encoders; for different priorities, using different FEC encoding matrices to perform FEC coding of MMT packets, to generate corresponding FEC codes;

c) Integrating the FEC codes formed after performing FEC coding of MMT packets with different priorities in the same data flow in the previous step, to generate an FEC code stream;

d) After FEC coding is completed, returning the corresponding repair characters, the FEC data load identification and the original data load identification;

e) Packaging all repair characters into an FEC repair packet and sending to the transport layer.

Further, the method comprises a step of identifying FEC flows, the FEC coding structure used and FEC code by the signaling; to support the mechanism, the fec_flow_descriptor field in the signaling is modified: a new fec_coding_structure is added based on the current three kinds of fec_coding_structure fields in the AL-FEC message; the function of the fec_coding_structure is to describe the currently used FEC coding scheme, including the selected coding algorithm, whether to use the private coding scheme, the maximum protection time window time and value, etc.; the field is located in the AL-FEC signaling and is transmitted to the receiving end; the flag bit of the newly added fec_coding_structure is selected within the range of the existing reserved; the original signaling only supports the repair information of one FEC flow multiplexing multiple media resources; the parts with different importance of one media resource is added now; FEC signaling is respectively controlled to refine the FEC mechanism; the server is able to dynamically adjust the FEC strength of different parts of the media resource according to the user network status, to achieve a balance point between the network bandwidth and user experience.

Further, Method IV: for the architecture of MMT AL-FEC sending end, the flow method of the sending end comprises steps of:

a) Generating MMTP flows and signaling by the server based on media resources;

b) Transmitting the MMT load to the FEC mechanism; performing unequal error protection with the D-EWF code according to the distinction of content importance in the flag bit;

c) After the D-EWF code is encoded, returning the corresponding repair characters, the FEC data load identification and the source data load identification; and d) Packaging all repair characters into an FEC repair packet and sending to the transport layer.

Further, Method IV comprises a step of identifying FEC flows, the FEC coding structure used and D-EWF code by the signaling; to support the mechanism, the FEC_FLOW_DESCRIPTOR field in the signaling needs to be modified: the original signaling only supports the repair information of one FEC flow multiplexing multiple media resources; the parts with different importance of one media resource is added now; FEC signaling is respectively controlled to refine the FEC mechanism; the server dynamically adjusts the coding strength of D-EWF code of the media resource according to the user network status, to achieve a balance point between the network available bandwidth and user experience.

Further, Method IV comprises steps of performing virtual expansion of degree distribution range by introducing the expansion factor; dividing the virtual expansion data into different windows by combining with the window technology of D-EWF code; LT coding each window by using optimized robust soliton distribution, to enhance the protection of important data.

Compared with the prior art, the invention has the following beneficial effects:

By using the technical scheme of the invention, for the data congestion caused by excessive coding in the current FEC system, the media content is able to be classified and endowed with different importance, and controlled by signaling and/or indicating bit; different FEC coding strengths is able to be adopted; further, the duplication-expanding window fountain (D-EWF) code with the unequal error protection (UEP) performance is able to be adopted, to achieve the maximum guarantee of media content quality and reduce the large amount of data caused by FEC.

BRIEF DESCRIPTION OF THE DRAWINGS

Other features, objects, and advantages of the invention will become more apparent from reading the description of non-limiting embodiments detailed with reference to the following figures.

DETAILED DESCRIPTION OF THE PREFERRED EMBODIMENT

The invention is described in detail as follows with reference to specific embodiments. The following embodiments will help provide further understanding of the invention for those skilled in the art, and not in any way limit the invention. It shall be noted that several variants and improvements is able to be made without departing from concept of the invention for ordinary persons skilled in the art. All these fall within the protection scope of the invention.

Figure 1:
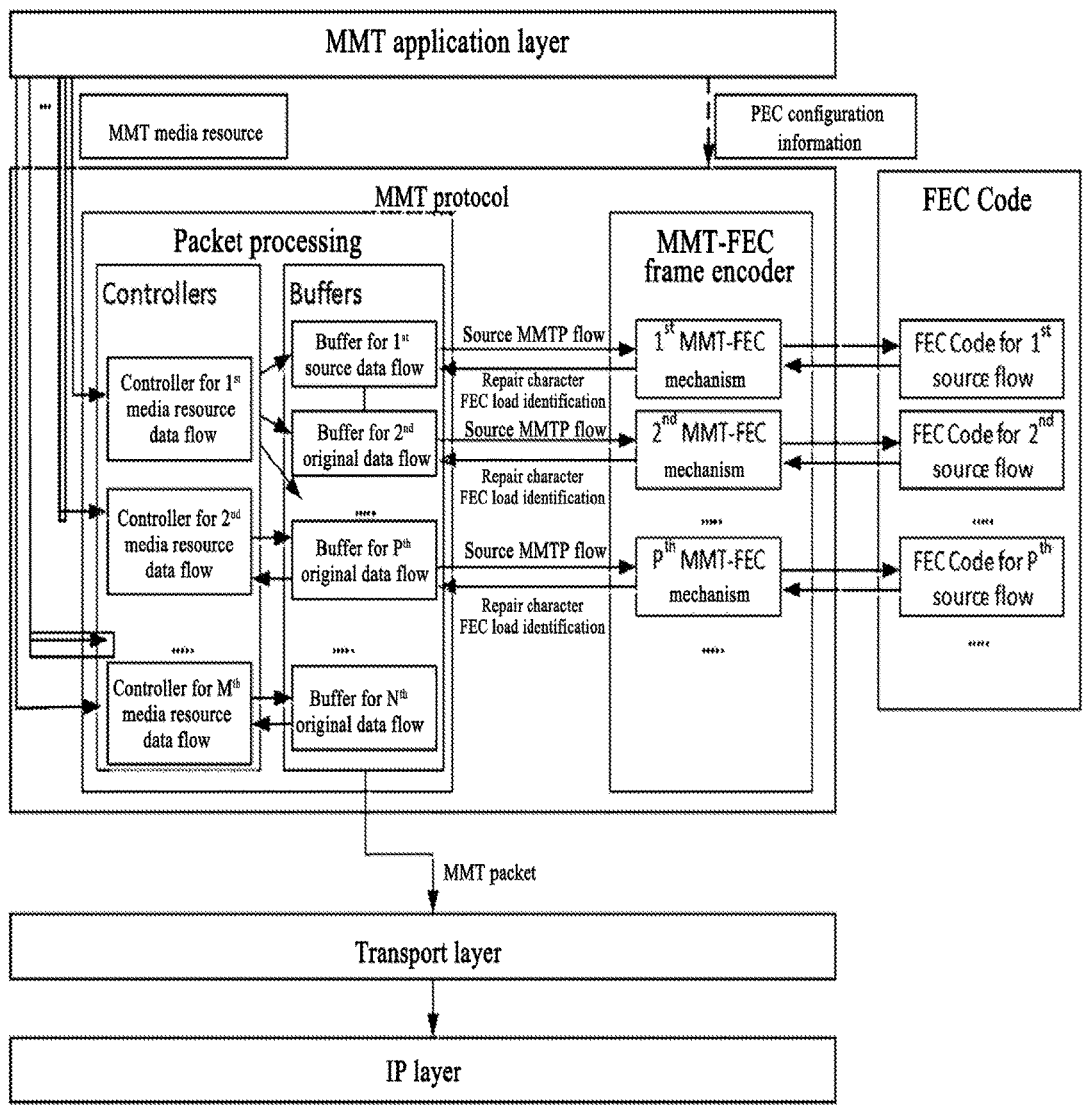
FIG. 1 is an FEC two-tier structure of media resources in MMT.

As shown in FIG. 1: an FEC (Forward error correction) two-tier structure of media resources in MMT; in the first layer, the source packet block is divided into many small blocks, which are FEC-protected separately; the second layer is a whole block, which is FEC-protected. The first layer is able to be finely divided to provide a smaller delay; the second layer ensures the recovery performance and smaller redundancy, but the flexibility is not enough.

Figure 2:
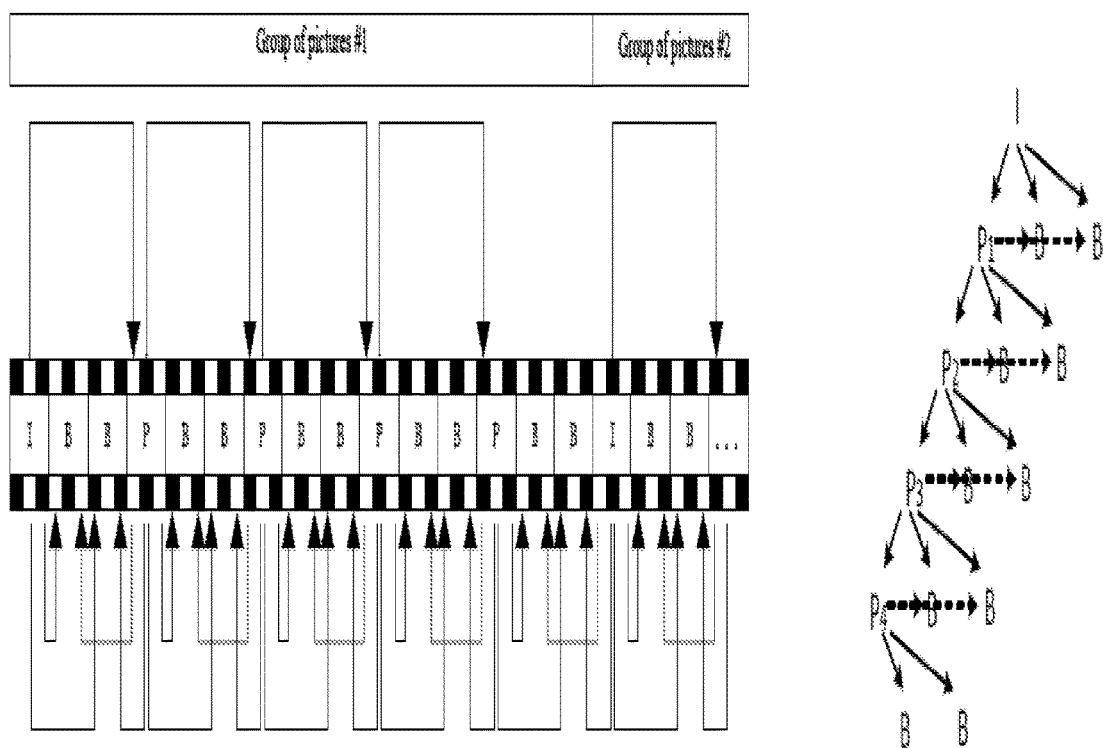
FIG. 2 is a dependency graph of frames in a group of pictures.

As shown in FIG. 2: a dependency graph of frames in a group of pictures. the figure shows that the dependency and importance of different frames in a group of pictures are different. I frame is the most important; the previous P frame is more important than the subsequent P frame; the importance of B frame is the lowest; therefore, the hierarchical FEC is able to be performed according to the importance. which is also the basis of FEC.

Embodiment I

Figure 3:
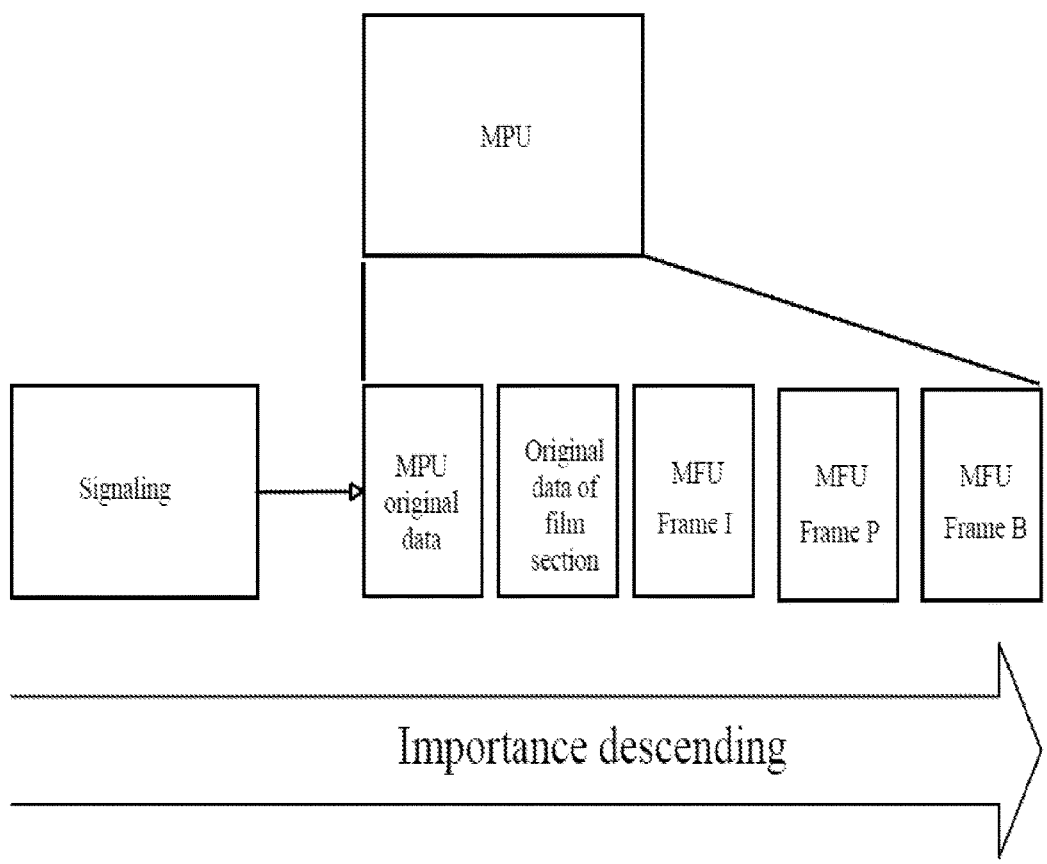
FIG. 3 is a diagram of the importance of generic MPU components and parts.

MMT (MPEG Media Transport) Transfer Protocol is Taken as an Example in the Embodiment and Implemented with Method I as Specified in Summary of the Invention:

In MMT scheme, the MFU packets under the MPU packet have different importance and lack of unequal error protection, so that a personalized transfer scheme is not able to be set. In MMT packets, frames with different importance (such as Frame I and Frame B) are discriminated (with indication signs), as shown in FIG. 2 and FIG. 3. However, the coding does not involve unequal error protection. Though the two-stage structure scheme and LA-FEC (The layer-aware Federal Election Commission) is able to realize unequal error protection to a certain degree, the flexibility is low and the complexity is high. Especially for the changing conditions of information channel and the receiving users with different characteristics (such as different buffers), the two existing modes have problems like large redundancy and poor adaptability, are only able to aim at single situation, and not able to consider from the user experience.

Solution:

1 Change the coding scheme according to packets of the frames (the importance of the frames is discriminated) with different importance and combining with conditions of the information channel and user experience. For example, when the information channel is in poor conditions, or user storage capacity is limited, the sending end will tend to protect Frame I data to enable users have big probability to receive Frame I, while abandoning Frame B and Frame P to greater degree when receiving those frames. Therefore, Frames B and P are abandoned at the sending end other than in subsequent processing by receiving end. The bandwidth resource saved to protect more important frames.

2 If no special instruction fields are added, coding is carried out according to prior conditions only, and unequal error protection is able to be arranged according to the importance of corresponding frames only. Add the flag bit of unequal error protection to the signaling transferring with MPU (media processing unit).

3 However, special instruction fields must be added to achieve a more personalized scheme, in which the protection scheme is changed in pace with quality of the information channel and customized according to user characteristics. Because different MFUs (Milli Flux Unit) have different importance, adding instructions to the front of the MFU packet header is able to personalize schemes.

Figure 4:
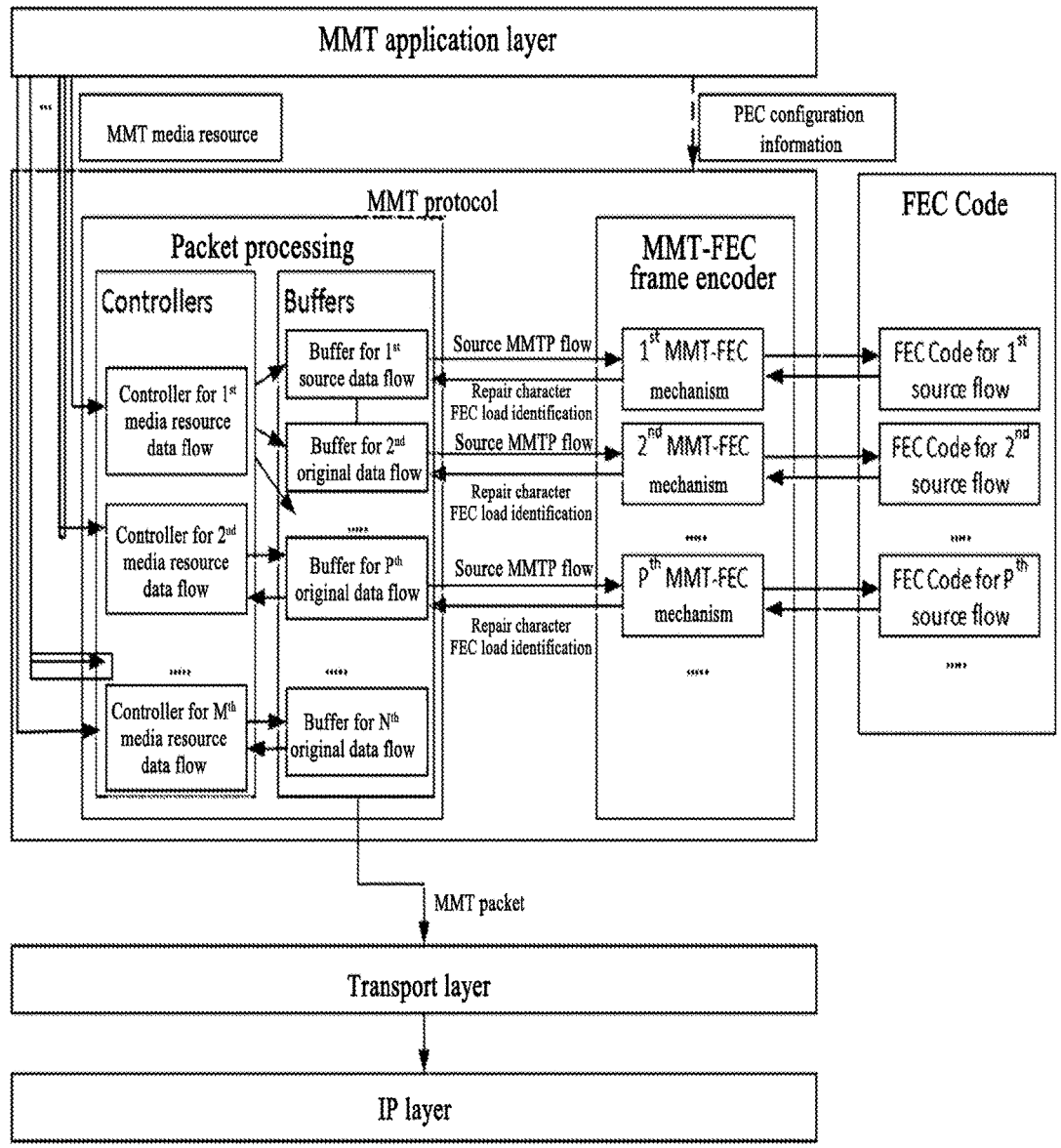
FIG. 4 is an architecture of MMT AL-FEC sending end modified in Embodiment I of the invention.

The architecture of MMT (MPEG Media Transport) AL-FEC (Application Layer Forward Error Correction) sending end modified in the embodiment is as shown in FIG. 4. Output in MMT protocol after streaming is modified mainly Data flows are distributed to different source buffers according to different priorities to carry out FEC respectively.

The architecture of the sending end is as shown in FIG. 4.

Flow method of the sending end comprises steps of:

a) Generating MMTP flows and signaling by the server based on media resources;

b) Analyzing the importance of each frame in the media resources. Distributing these MMT loads to different original data flows and transmitting them to corresponding FEC mechanisms as protections;

c) After FEC coding is completed, returning the corresponding repair characters, the FEC data load identification and the original data load identification; and d) Packaging all repair characters into an FEC repair packet and sending to the transport layer.

Identifying FEC flows, FEC coding structure used and FEC code by the signaling. To support the mechanism, the FEC_FLOW_DESCRIPTOR field in the signaling is modified in the embodiment.

Modifications of the Signaling are as Follows:

| Original | Modified |
|---|---|
| ... | ... |
| fec_flag | fec_flag |
| private_fec_flag | private_fec_flag |
| reserved //value "111111" | reserved // value "111110" |
| if (fec_flag==1) { | if (fec_flag==1) { |
| fec_flow_descriptor( ) { | fec_flow_descriptor( ) { |
| number_of_fec_flows //N1 | number_of_assets //N1 |
| for ( i=0; i<N1 ; i++) { | for ( i=0; i<N1 ; i++) { |
| fec_flow_id | packet_id |
| source_flow_id | number_of_fec_flows //N2 |
| number_of_assets //N2 | for ( j=0; j<N2 ;j++){ |
| for ( j=0; j<N2 ;j++){ | fec_flow_id |
| packet_id | source_flow_id |
| } | //detail fec coding configuration |
| //detail fec coding configuration | ... |
| ... | } |
| } | } |
| } | } |
| } | } |

The original signaling only supports repair information of one FEC flow multiplexing multiple media resources. To realize the purpose, the sequence and definition of the fec_flow_descriptor field are adjusted and modified in the embodiment. The change is indicated by using one reserved field. After the modification, the number_of_assets directs all the media resources carrying out FEC, the packet_id is the identification of each corresponding media resource, and the number_of_fec_flows indicate the number of FEC flows each media resource corresponds to (i.e., the number of levels). For the parts with different importance of one media resource, FEC signaling is respectively controlled to obtain different FEC flows, elaborate the FEC mechanism and the serve is able to dynamically adjust the FEC strength of different parts of the media resource according to the user network status. After receiving the signaling, the receiving end restores the media resource according to corresponding instructions, achieving a balance point between the network bandwidth and user experience.

Advantages of the Said Solution:

1 the solution is able to save resources. A waste of transferred resources will be caused if a frame received (such as, Frame B) is abandoned at the receiving end by a person according to conditions. The said solution solves such problems from the source end by abandoning unwanted packets during transferring with greater probability to protect the important packets to a greater extent.

2 The transfer scheme is personalized Video transfer should be based on the user experience. For more elaborated unequal error protection, the degree of FEC protection for Frame I and Frame B is able to be designed based on user status (such as, visual experience and buffer status).

The following table shows an example of transferring the coding of content level in the MMT using RS code (Reed-solomon code) simply. The coding schemes is able to be changed flexibly according to the network status and user needs maximize the frame receiving rate of the receiving end as much as possible, while saving the bandwidth, by reasonably configuring the FEC strength of each frame, to achieve the best user experience.

| Scenario | I scheme | P scheme | B scheme | redundancy % |
|---|---|---|---|---|
| FEC0 | None | None | None | 100 |
| FEC1 | RS(16, 15) | RS(16, 15) | RS(16, 15) | 93.75 |
| FEC2 | RS(16, 13) | RS(16, 13) | RS(16, 13) | 81.25 |
| FEC3 | RS(16, 13) | RS(16, 13) | RS(16, 15) | 86.83 |

Embodiment II

MMT Transfer Protocol is Taken as an Example in the Embodiment and Implemented with Method II as Specified in Summary of the Invention:

In MMT scheme, the MFU packets under the MPU packet have different importance and lack of unequal error protection, which disable a personalized transfer scheme to be set. In MMT packets, frames with different importance (such as Frame I and Frame B) are discriminated (with indication signs), as shown in FIG. 2 and FIG. 3. However, the coding does not involve unequal error protection. Though the two-stage structure scheme and LA-FEC is able to realize unequal error protection to a certain degree, their flexibility is low and complexity is high. Especially for the changing conditions of information channel and the receiving users with different characteristics (such as different buffers), the two existing modes have problems like large redundancy and poor adaptability, are only able to aim at single situation, and not able to consider from user experience.

Solution:

1 Change the coding scheme according to packets of the frames (the importance of the frames is discriminated) with different importance and combining with conditions of the information channel and user experience. For example, when the information channel is in poor conditions, or user storage capacity is limited, the sending end will tend to protect Frame I data to enable users have big probability to receive Frame I, while abandoning Frame B and Frame P to greater degree when receiving those frames. Therefore, Frames B and P are abandoned at the sending end other than in subsequent processing by receiving end. The bandwidth resource saved therefrom may be used to protect more important frames.

2 If no special instruction fields are added, coding is able to be carried out according to prior conditions only, and the unequal error protection is able to be arranged according to the importance of corresponding frames only. Add the flag bit of unequal error protection to the signaling transferring with MPU.

3 However, special instruction fields must be added to achieve a more personalized scheme, in which the protection scheme is changed in pace with quality of the information channel and customized according to user characteristics. Because different MFUs have different importance, adding instructions to the front of the MFU packet header is able to personalize schemes.

Figure 5:
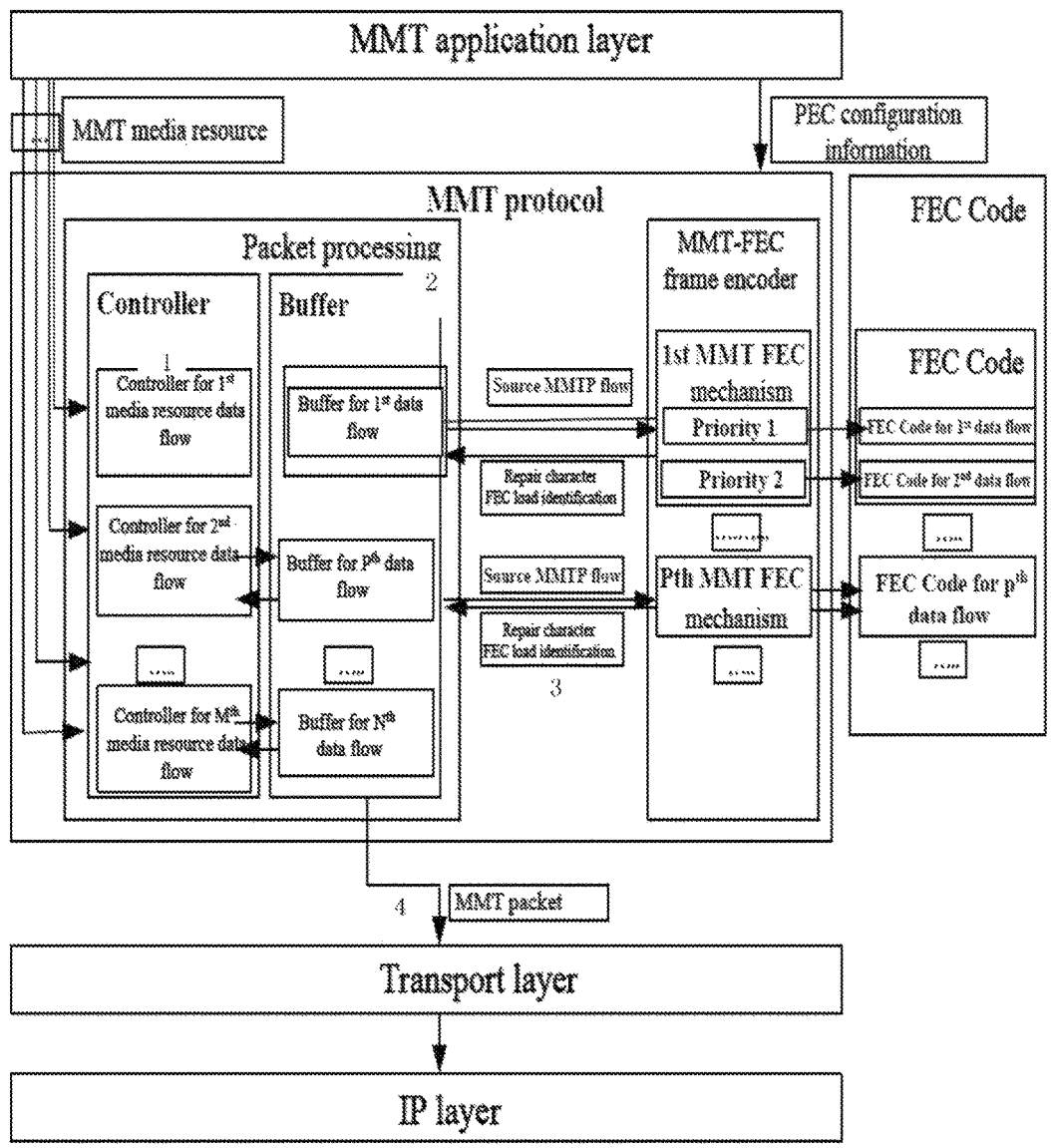
FIG. 5 is an architecture of MMT AL-FEC sending end modified in Embodiment II of the invention.

The architecture of MMT AL-FEC sending end modified in the embodiment is as shown in FIG. 5. Output in MMT protocol after streaming is modified mainly MMT packets are sent to different encoders according to their priorities to respectively carry out FEC.

The architecture of the sending end is as shown in FIG. 5.

Flow method of the sending end comprises steps of:

a) Generating MMTP flows and signaling by the server based on media resources;

b) According to different importance of each frame of data in MMT flows, sending MMT packets to different FEC encoders to generate corresponding FEC codes;

c) After FEC coding is completed, returning the corresponding repair characters, the FEC data load identification and the original data load identification; and d) Packaging all repair characters into an FEC repair packet and sending to the transport layer.

Identifying FEC flows, FEC coding structure used and FEC code by the signaling. To support the mechanism, the fec_flow_descriptor field in the signaling is modified in the embodiment: the original signaling only supports repair information of one FEC flow multiplexing multiple media resources; the parts with different importance of one media resource is added now; the modified signaling respectively controls FEC coding based on the parts with different importance of one media resource to achieve different FEC flows to elaborate the FEC mechanism; the server is able to dynamically adjust the FEC strength of different parts of the media resource according to the user network status. After receiving the signaling, the receiving end restores the media resource according to corresponding instructions, achieving a balance point between the network bandwidth and user experience.

TABLE 1

Description of New fec_coding_structure

| Syntax | Values | No. of bits | Mnemonic |
|---|---|---|---|
| if (fec_coding_structure == 0100) { | | | |
|   num_of_priority_for_mmtps | N4 | 8 | uimbsf |
|   if (private_fec_flag == 1) { | | | |
|     private_flag | | 1 | bslbf |
|     private_field_length | | 7 | bslbf |
|     private_field | "" | N7*8 | uimbsf |
|   } | | | |
|   for ( l=0;l<N4 ;l++){ | | | |
|     priority_id | | 8 | uimbsf |
|       fec_code_id_for_repair_flow | | 8 | uimbsf |
|       repair_flow_id | | 8 | uimbsf |
|       maximum_k_for_repair_flow | | 24 | uimbsf |
|       maximum_p_for_repair_flow | | 24 | uimbsf |
|       protection_window_time | | 32 | uimbsf |
|       protection_window_size | | 32 | uimbsf |
|   } | | | |
|     } | | | |

The original signaling only supports the repair information of one FEC flow multiplexing multiple media resources. For the purpose, in the embodiment, a new fec_coding_structure is added based on the current three kinds of fec_coding_structure fields in the AL-FEC message; the function of the fec_coding_structure is to describe the currently used FEC coding scheme, including the selected coding algorithm, whether to use a private coding scheme, the maximum protection time window time and value, etc.; the field is located in the AL-FEC signaling and is transmitted to the receiving end; the value of the flag bit of the newly added fec_coding_structure may be selected within the existing range of the reserved and 0100 is recommended in the scheme;

Meanings of the fields in the table are as follows:

num_of_priority_for_mmtps: the number of priorities for one media resource.

private_fec_flag: indicating bit, indicating whether to use private FEC coding scheme.

private_flag: indicating bit, indicating whether there is one private_field for describing the private FEC coding scheme used.

private_field_length: length field, for describing the length of the field of the private FEC coding scheme.

private_field: for detailing the private FEC scheme.

priority_id: priority id, for indicating the priority of MMT packet.

fec_code_id_for_repair_flow: for describing the FEC coding scheme used.

repair_flow_id: 8 bits of integers, for indicating the correspondence between the generated FEC repair flow and the packet id in FEC repair packet header.

maximum_k_for_repair_flow: 24 bits of integers, for describing the maximum number of source symbols in one source symbol block.

maximum_p_for_repair_flow: 24 bits of integers, for describing the maximum number of repair symbols in one repair symbol block.

protection_window_time: protection window time, for indicating the maximum time difference between sending the first source/repair packet and sending the last source/repair packet in FEC coding. The unit is millisecond.

protection_window_size: protection window value, for indicating the maximum count value between sending the first FEC packet load and sending the last FEC packet load in FEC coding flow.

In the embodiment, the media content is classified and endowed with different importance; in the absence of shunting the original media data flow, the data packets are transmitted to the corresponding FEC encoder according to the importance of frames contained in the media packet in combination with channel conditions and user experience, to conduct different degrees of protection Advantages of the Said Solution:

1 The present solution is able to save resources. A waste of transferred resources is caused if a frame received (such as, Frame B) is abandoned at the receiving end by a person according to conditions. The said solution solves such problems from the source end by abandoning unwanted packets during transferring with greater probability to protect the important packets to a greater extent.

2 The transfer scheme is personalized Video transfer should be based on user experience. For more elaborated unequal error protection, the degree of FEC protection for Frame I and Frame B is able to be designed based on user status (such as, visual experience and buffer status).

Embodiment III

MMT Transfer Protocol is Taken as an Example in the Embodiment and Implemented with Method III as Specified in Summary of the Invention:

In MMT scheme, the MFU packets under the MPU packet have different importance and lack of unequal error protection, so that a personalized transfer scheme is not able to be set. In MMT packets, frames with different importance (such as Frame I and Frame B) are discriminated (with indication signs), as shown in FIG. 2 and FIG. 3. However, the coding does not involve unequal error protection. Though the two-stage structure scheme and LA-FEC is able to realize unequal error protection to a certain degree, their flexibility is low and complexity is high. Especially for the changing conditions of information channel and the receiving users with different characteristics (such as different buffers), the two existing modes have problems like large redundancy and poor adaptability, are only able to aim at single situation, and not able to consider from user experience.

Solution:

1 Change the coding scheme adaptively according to packets of the frames (the importance of the frames is discriminated) with different importance and combining with conditions of the information channel and user experience. For example, when the information channel is in poor conditions, or user storage capacity is limited, the sending end will tend to protect Frame I data to enable users have big probability to receive Frame I, while abandoning Frame B and Frame P to greater degree when receiving those frames. Therefore, Frames B and P are abandoned at the sending end other than in subsequent processing by receiving end. The bandwidth resource saved therefrom may be used to protect more important frames. However, in time-varying channel, FEC coding scheme is able to be changed adaptively according to changes in current network status. For example, when the network status becomes worse, encoding matrix of FEC coding is able to be changed by changing FEC seed to enhance the strength of protection for transferring data.

2 If no special instruction fields are added, coding is able to be carried out according to prior conditions only, and unequal error protection is able to be arranged according to the importance of corresponding frames only. Add the flag bit of unequal error protection to the signaling transferring with MPU.

3 However, special instruction fields must be added to achieve a personalized scheme, in which the protection scheme is changed in pace with quality of the information channel and customized according to user characteristics. Because different MFUs have different importance, adding instructions to the front of the MFU packet header is able to personalize schemes.

Figure 6:
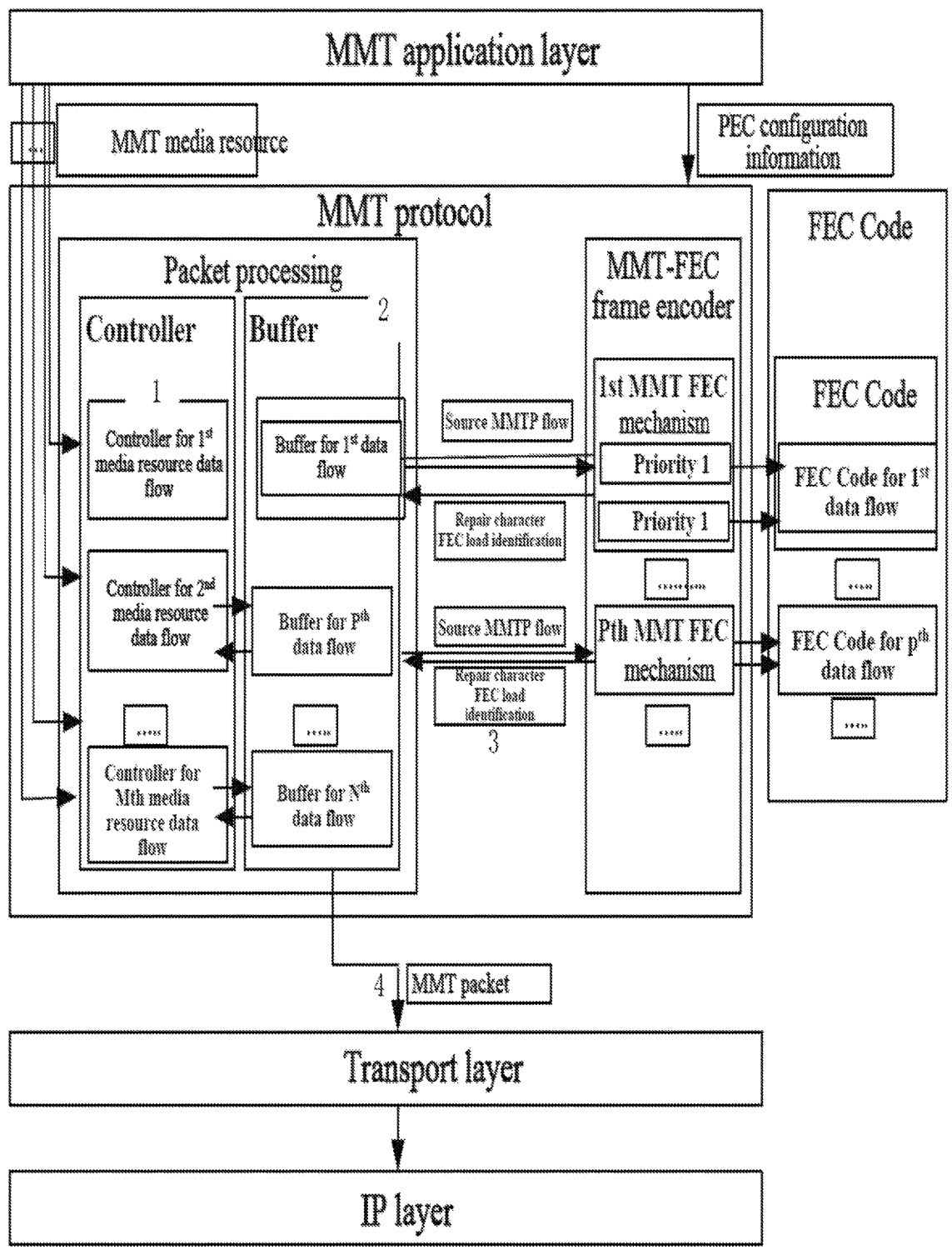
FIG. 6 is an architecture of MMT AL-FEC sending end modified in Embodiment III of the invention.

The architecture of MMT AL-FEC sending end modified in the embodiment is as shown in FIG. 6. Output in MMT protocol after streaming is modified mainly MMT packets are sent to different encoders according to their priorities to respectively carry out FEC coding. According to different priorities of MMT packets, different encoding matrices are selected. FEC codes generated from FEC encoder processing each priority are integrated into one flow of FEC codes.

The architecture of the sending end is as shown in FIG. 6. Flow method of the sending end comprises steps of:

a) Generating MMTP flows and signaling by the server based on media resources;

b) According to different importance of each frame of data in MMT flows, transmitting MMT packets to different FEC encoders; for different priorities, using different FEC encoding matrices to perform FEC coding of MMT packets, to generate corresponding FEC codes;

c) Integrating the FEC codes formed after performing FEC coding of MMT packets with different priorities in the same data flow in the previous step, to generate an FEC code stream;

d) After FEC coding is completed, returning the corresponding repair characters, the FEC data load identification and the original data load identification; and e) Packaging all repair characters into an FEC repair packet and sending to the transport layer.

Identifying FEC flows, FEC coding structure used and FEC code by the signaling. To support the mechanism, the FEC_FLOW_DESCRIPTOR field in the signaling is modified in the embodiment.

priority_mapping: priority mapping, for indicating the mapping between the different packets and resource priorities in a media resource.

private_fec_flag: indicating bit, indicating whether to use a private FEC coding scheme.

private_flag: indicating bit, indicating whether one private_field is available for describing the private FEC coding scheme used.

private_field_length: length field, for describing the length of the field of the private FEC coding scheme.

private_field: for detailing the private FEC scheme.

priority_id: priority id, for indicating the priority of MMT packet.

fec_code_id_for_repair_flow: for describing the FEC coding scheme used.

repair_flow_id: 8 bits of integers, for indicating the correspondence between the generated FEC repair flow and the packet id in FEC repair packet header.

maximum_k_for_repair_flow: 24 bits of integers, for describing the maximum number of source symbols in one source symbol block.

TABLE 1

Description of fec_coding_structure

| Syntax | Values | No. of bits | Mnemonic |
|---|---|---|---|
| if (fec_coding_structure == 0110) { | | | |
|     seed | | 32 | |
|     num_of_priority_for_mmtps | N4 | 8 | uimbsf |
|     for ( l=0;l<N4 ;l++){ | | | |
|         priority_mapping | | | |
|     } | | | |
|     if (private_fec_flag == 1) { | | | |
|         private_f lag | | 1 | bslbf |
|         private_field_length | | 7 | bslbf |
|         private_field | "" | N7*8 | uimbsf |
|     } | | | |
| | | 8 | uimbsf |
|         repair_flow_id | | 8 | uimbsf |
|         fec_code_id_for_repair_flow | | 8 | uimbsf |
|         maximum_k_for_repair_flow | | 24 | uimbsf |
|         maximum_p_for_repair_flow | | 24 | uimbsf |
|         protection_window_time | | 32 | uimbsf |
|         protection_window_siz | | 32 | uimbsf |
|     } | | | |

The original signaling only supports the repair information of one FEC flow multiplexing multiple media resources. In the embodiment, a new fec_coding_structure is added; the function of the fec_coding_structure is to describe the currently used FEC coding scheme, including the selected coding algorithm, whether to use a private coding scheme, the maximum protection time window time and value, etc.; the field is located in the AL-FEC signaling and is transmitted to the receiving end; the value of the flag bit of the newly added fec_coding_structure may be selected within the existing range of the reserved and 0110 is recommended in the scheme;

Meanings of the fields in the table are as follows:

seed: random seed, used as an initial condition for generating pseudo-random numbers, for generating pseudo-random sequences to construct the generator matrix and check matrix for FEC coding. Many algorithms are for seed selection, such as obtaining current system time, obtaining current process ID.

num_of_priority_for_mmtps: the number of priorities for one media resource.

maximum_p_for_repair_flow: 24 bits of integers, for describing the maximum number of repair symbols in one repair symbol block.

protection_window_time: protection window time, for indicating the maximum time difference between sending the first source/repair packet and sending the last source/repair packet in FEC coding. The unit is millisecond.

protection_window_size: protection window value, for indicating the maximum count value between sending the first FEC packet load and sending the last FEC packet load in FEC coding flow.

The modified signaling respectively controls FEC coding for different priorities with different encoding matrices based on the parts with different importance of one media resource. For one media data flow, only one flow of FEC codes is generated to elaborate the FEC mechanism while reducing the increased network traffic due to excessive FEC encoding. With the scheme, the server is able to dynamically adjust the FEC strength of different parts of the media resource according to the user network status. After receiving the signaling, the receiving end is able to analyze seed and priorities of each resource packet, and generate check matrix according to the seed to perform FEC decoding and restore the media resource, achieving a balance point between the network bandwidth and user experience.

Advantages of the Said Solution:

1 The present solution is able to save resources. A waste of transferred resources is caused if a frame received (such as, Frame B) is abandoned at the receiving end by a person according to conditions. The said solution solves such problems from the source end by abandoning unwanted packets during transferring with greater probability to protect the important packets to a greater extent.

2 The transfer scheme is personalized Video transfer should be based on the user experience. For more elaborated unequal error protection, the degree of FEC protection for Frame I and Frame B is able to be designed based on the user status (such as, visual experience and buffer status).

3 The present solution is able to change the mode of FEC coding adaptively according to current network status. On the basis of FEC protection with different strength for data with different priorities, when the network status becomes worse and packet loss rate increases, the seed of FEC is able to be adjusted adaptively, the generator matrix for FEC is able to changed, and FEC strength is able to be increased to resist the impact of worsening of the network.

4 The existing AL-FEC scheme in MMT only supports generation of different FEC code flows for MMT packets with different priorities. The scheme proposed in the scheme supports generation of only one FEC code flow for one media resource data flow, which is able to greatly reduce the increase of flow caused by FEC and reduce network pressure.

Embodiment IV

MMT Transfer Protocol is Taken as an Example in the Embodiment and Implemented with Method IV as Specified in Summary of the Invention:

FEC two-tier structure of media resources in MMT is as shown in FIG. 1. In respect of two layers aiming at FEC of media resources in MMT, in the first layer, the source packet block is divided into more small blocks, which are FEC-protected separately; the second layer is a whole block, which is FEC-protected. The first layer is able to be finely divided to provide a smaller delay; the second layer ensures the recovery performance and smaller redundancy. P1 and P2 in the figure are repair symbol blocks generated by FEC encoders 1 and 2 respectively.

Figure 8:
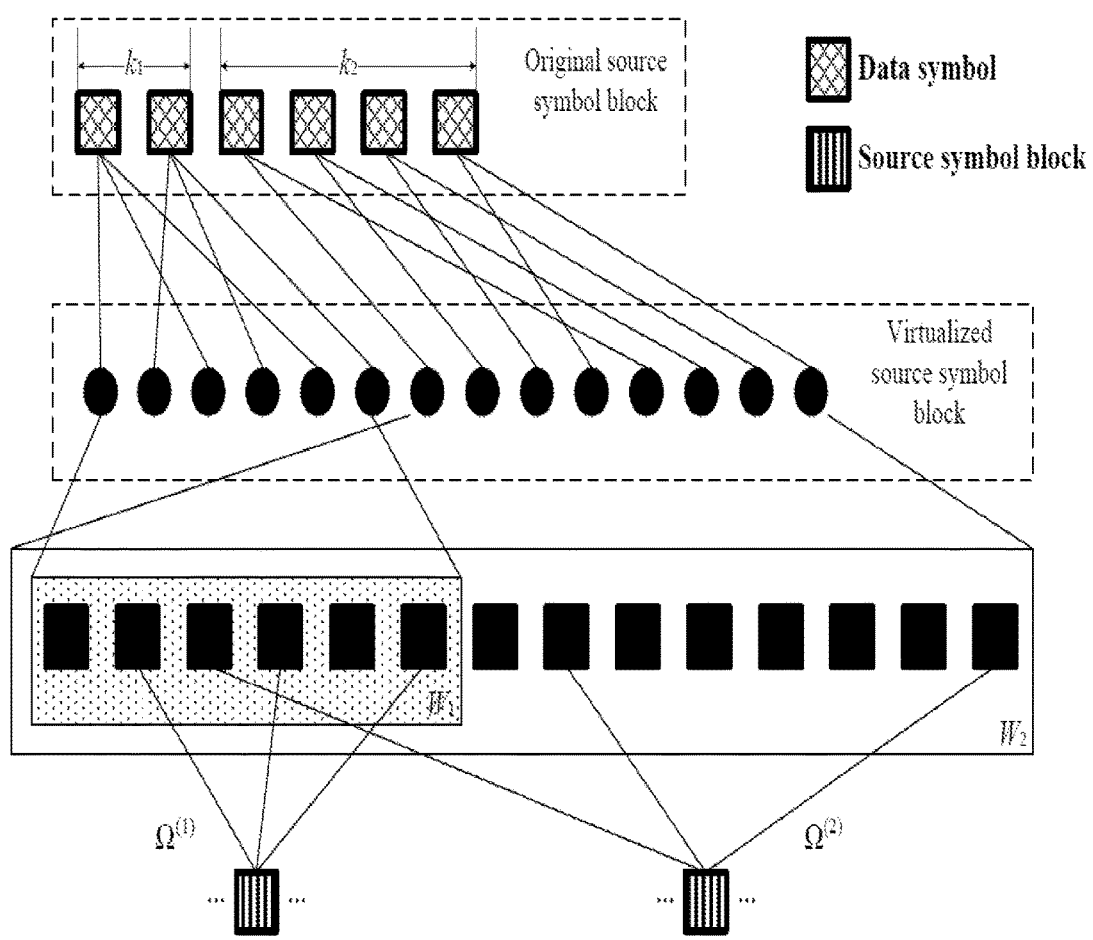
FIG. 8 is a block diagram of coding for D-EWF code in Embodiment IV of the invention.

As shown in FIG. 8: the case of transferring source data with two important levels is specifically considered. Divide K source data into 2 important levels (i.e., $s_1$ and $s_2$) by importance. Let $s_1$ be the most important bits MIB (Most ImPortant Bits, the most important information bits), $s_2$ be the least important bits LIB (Least ImPortant Bits, the least important data bits).

In MMT scheme, the MFU packets under the MPU packet have different importance and lack of unequal error protection, so that a personalized transfer scheme is not able to be set. In MMT packets, content with different importance is discriminated (with indication signs), as shown in FIG. 3. However, the coding does not involve unequal error protection. Though the two-layer coding scheme shown in FIG. 1 and LA-FEC is able to realize unequal error protection to a certain degree, the flexibility is low and complexity is high. Especially for the changing conditions of information channel and the receiving users with different characteristics (such as different buffers), the two existing modes have problems like large redundancy and poor adaptability, are only able to aim at single situation, and not able to consider from user experience.

Solution:

1 However, special instruction fields must be added to achieve a more personalized scheme, in which the protection scheme is changed in pace with quality of the information channel and customized according to user characteristics. Because different MFUs have different importance, adding instructions to the front of the MFU packet header is able to personalize schemes.

Figure 7:
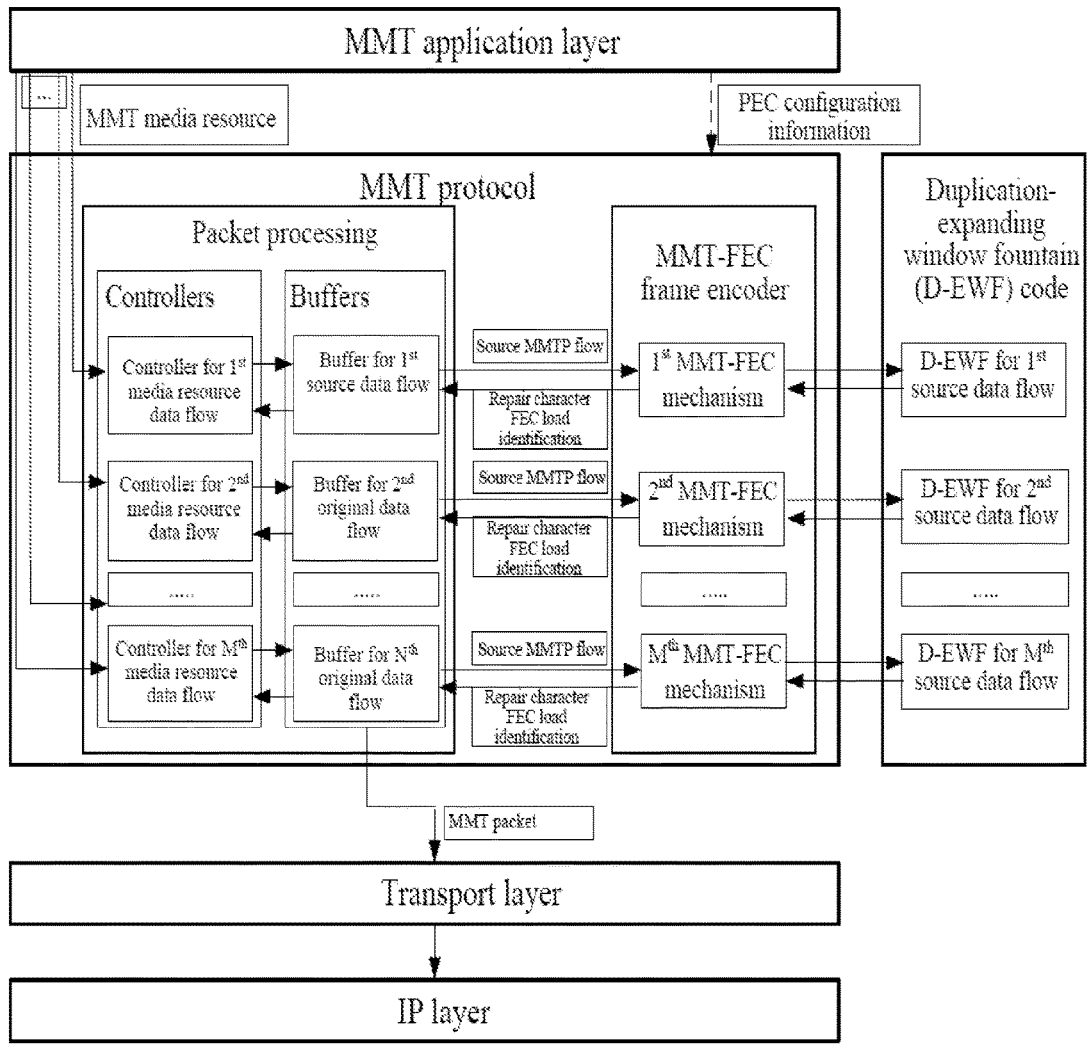
FIG. 7 is an architecture of MMT AL-FEC sending end modified in Embodiment IV of the invention.

The modified architecture of MMT AL-FEC sending end is as shown in FIG. 7. Output in MMT protocol after streaming is modified mainly. The data flows are transferred to the source buffers and D-EWF coding is performed according to the importance of different content indicated by the flag bit.

The architecture of the sending end is as shown in FIG. 7.

Flow method of the sending end comprises steps of:

a) Generating MMTP flows and signaling by the server based on media resources;

b) Transmitting the MMT load to the FEC mechanism; performing unequal error protection with the D-EWF code according to the distinction of content importance in the flag bit;

c) After the D-EWF code is encoded, returning the corresponding repair characters, the FEC data load identification and the source data load identification; and d) Packaging all repair characters into an FEC repair packet and sending to the transport layer.

Identifying FEC flows, FEC coding structure used and D-EWF code by the signaling. To support the mechanism, the FEC_FLOW_DESCRIPTOR field in the signaling is modified as follows in the embodiment:

| Original | Modified |
|---|---|
| ... | ... |
| fec_flag | fec_flag |
| private_fec_flag | private_fec_flag |
| reserved //value "111111" | reserved // value "111110" |
| if (fec_flag==1) { | if (fec_flag==1) { |
| fec_flow_descriptor( ) { | fec_flow_descriptor( ) { |
| number_of_fec_flows //N1 | number_of_assets //N1 |
| for ( i=0; i<N1 ; i++) { | for ( i=0; i<N1 ; i++) { |
| fec_flow_id | packet_id |
| source_flow_id | number of fec flows //N2 |
| number_of_assets //N2 | for ( j=0; j<N2 ;j++){ |
| for ( j=0; j<N2 ;j++){ | fec_flow_id |
| packet_id | source_flow_id |
| } | //detail fec coding configuration |
| //detail fec coding configuration | ... |
| ... | |
| ... | } |
| } | } |
| } | } |
| } | } |

The sequence and definition of the fec_flow_descriptor field are adjusted and modified in the embodiment. Introduction of UEP mechanism is directed by using one reserved field. After the modification, the number_of_assets directs all the media resources carrying out FEC, the packet_id is the identification of each corresponding media resource, and the number_of_fec_flows directs the number of FEC flows each media resource corresponds to (i.e., the number of levels). For parts with different importance of one media resource, the duplication-expanding window fountain (D-EWF) code with UEP performance is used for protection. The server is able to dynamically adjust the D-EWF coding strength according to the user network status. After receiving the signaling, the receiving end restores the media resource according to corresponding instructions, achieving a balance point between the network bandwidth and user experience.

2 For media content with different importance degree, protection for important media content is strengthened with duplication-expanding window fountain. The specific implementation process is as follows:

Consider the case of transferring source data with two important levels. As shown in FIG. 3, divide K source data into 2 important levels (i.e., $s_1$ and $s_2$) by importance. Let $s_1$ be the most important bits MIB (Most ImPortant Bits, the most important information bits), $s_2$ be the least important bits LIB (Least ImPortant Bits, the least important data bits). $\pi_1$ and $\pi_2$ are proportions of $s_1$ and $s_2$ in the total data respectively. Data lengths corresponding to $s_1$ and $s_2$ are $k_1=\pi_1 \cdot K$ and $k_2=\pi_2 \cdot K$ respectively, wherein $\pi_1+\pi_2=1$.

Expand the two-layer data obtained according to expansion factors $\psi_1$ and $\psi_2$, obtaining virtual expansion layer data: $s_1'$ and $s_2'$, wherein $k_1'$ and $k_2'$ represent $k_1'=k_1 \cdot \psi_1$ and $k_2'=k_2 \cdot \psi_2$, the symbol lengths of $s_1'$ and $s_2'$ data. The proportion of virtual expansion data is described with $\gamma_1$ and $\gamma_2$. Sum of virtual extension layer data: $K'=k_1'+k_2'$.

Divide the virtual extension layer data $s_1'$ and $s_2'$ into 2 windows, i.e., $W_1=s_1'$ and $W_2=s_1'+s_2'$. Total virtual data of $W_1$ is $k_1'$, Total virtual data of $W_2$ is $|W_2|=K'$, Increase the degree distribution of the first window $W_1$ from $k_1$ to $k_1'$. Increase the degree distribution of the second window $W_2$ from K to K'. Robust soliton distribution $\Omega_{rs}(k, c, \delta)$ is used. Their probability distributions are respectively:

$$\mu(i) = \frac{\rho(i) + \tau(i)}{\sum_{i=1}^{k}(\rho(i) + +\tau(i))}$$

$$\rho(i) = \begin{cases} 1/k & i = 1 \\ 1/i \cdot (i-1) & i = 2, \ldots, k \end{cases} \text{ and}$$

$$\tau(i) = \begin{cases} \dfrac{R}{i \cdot k} & i = 1, \ldots, k/R - 1 \\ \dfrac{R \log R/\delta}{k} & i = k/R \\ 0 & i = k/R + 1, \ldots, k \end{cases}$$

Wherein, $R=c \cdot \log(k/\delta) \cdot \sqrt{k}$ and $c>0$, k is the number of data symbols, and $\delta$ is the probability of decoding failure. Let $c=0.1$ and $\delta=0.5$, and use robust soliton distribution functions $\hat{\Omega}^{(1)}(k_1',c,\delta)$ and $\hat{\Omega}^{(2)}(K',c,\delta)$ to $W_1$ and $W_2$ respectively. Let the selection probability of the first window $W_1$ be $\Gamma_1$, and the selection probability of $W_2$ be $\Gamma_2=1-\Gamma_1$.

After partitioning window, perform index substitution for LT coding: randomly generating a number $\xi$; in case of $0<\xi\leq\Gamma_1$ (i.e., selecting $1^{st}$ window $W_1$), degree $d_1$ is generated by degree distribution $\Omega^{(1)}$; $d_1$ data are randomly selected from $W_1$ virtual data. j represents the index $j \in \{0, \ldots, k_1 \cdot \psi_1 - 1\}$, in $W_1$ virtual data $k_1 \cdot \psi_1$; m represents the index $m \in \{0, \ldots, k_1-1\}$, of original $k_1$. Through the following conversion, from j, obtain the index $m=j \mod k_1$, $0 \leq j \leq k_1-1$;

in case of $\Gamma_1 < \xi \leq 1$ (i.e., selecting $2^{nd}$ window $W_2$), degree $d_2$ is generated by degree distribution $\Omega^{(2)}$; $d_2$ data are randomly selected from $W_2$ virtual data. j represents the index $j \in \{0, \ldots, k_1 \cdot \psi_1 + k_2 \cdot \psi_2 - 1\}$, in $W_2$ virtual data $(k_1 \cdot \psi_1 + k_2 \cdot \psi_2)$; m represents the index $m \in \{0, \ldots, K-1\}$, of original $k_2$. Through the following conversion, from j, obtain the index m;

$$m = \begin{cases} j \mod k_1 & \text{If } 0 \leq j \leq k_1 \cdot \psi_1 - 1; \\ [(j - k_1 \cdot \psi_1) \mod k_2] + k_1 & \text{If } k_1 \cdot \psi_1 \leq j \leq k_1 \cdot \psi_1 + k_2 \cdot \psi_2 - 1; \end{cases}$$

Figure 9:
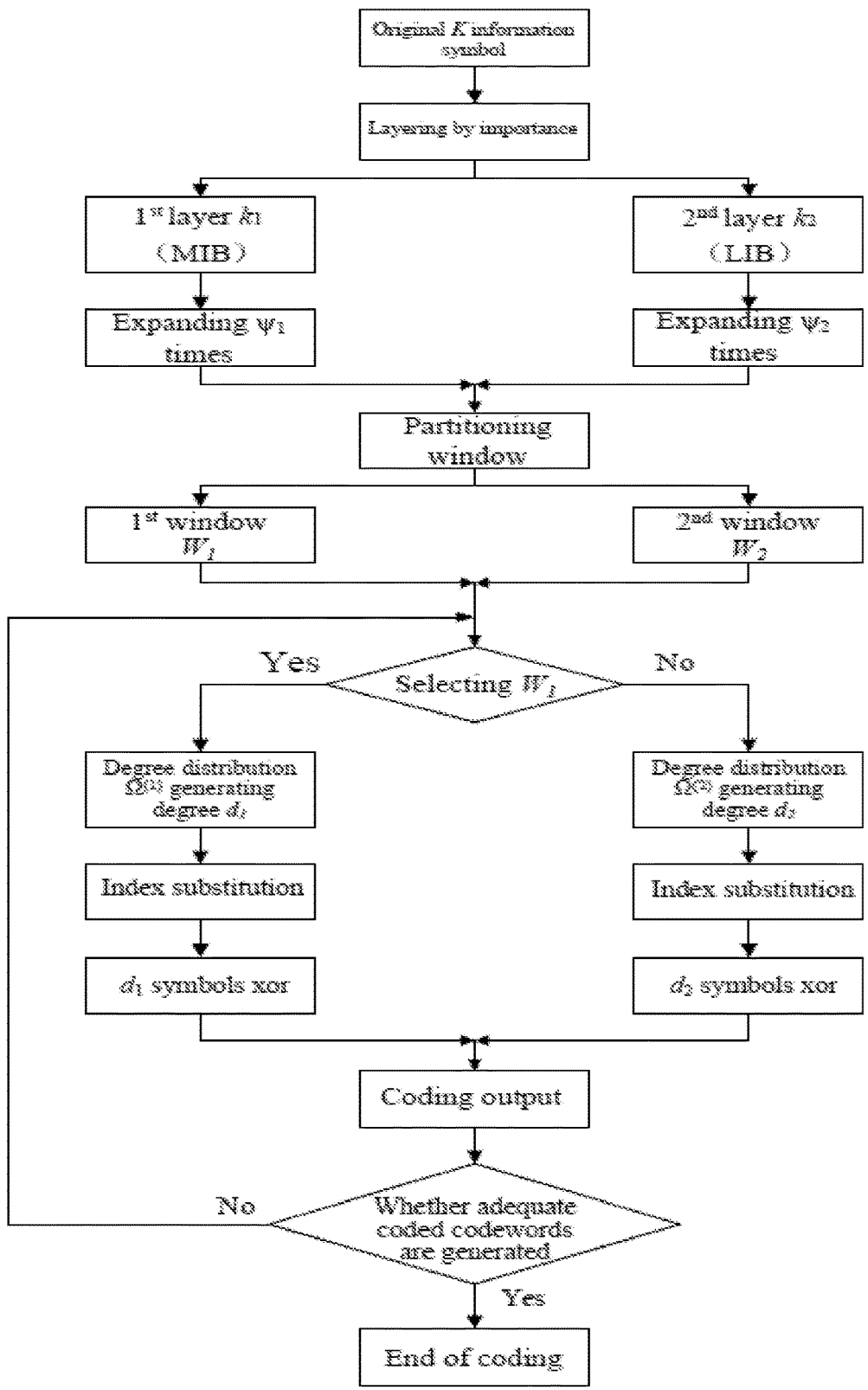
FIG. 9 is a flowchart of coding for D-EWF code in Embodiment IV of the invention.

Indexing m to obtain original symbol and perform XOR operation, to obtain coded codewords. Repeat the above process until adequate coded codewords are obtained. FIG. 9 shows the flow of coding for D-EWF codes.

Advantages of the Said Solution:

1 The present solution is able to save resources. A waste of transferred resources is caused if media content received is abandoned at the receiving end by a person according to conditions. The said solution solves such problems from the source end by protecting the less important media content with lower degree during transferring and distributing more bandwidth resources to more important content to protect the more important content to a greater extent.

2 The transfer scheme is personalized Video transfer should be based on the user experience. By changing the D-EWF coding strength of important and unimportant media content, unequal error protection is able to be elaborated based on user status (such as, visual experience and buffer status).

Part of specific embodiments of the invention is described above and the invention is not limited to the above-mentioned specific embodiments, and those skilled in the art is able to bring out different variants and modifications within the scope of the claims, and it shall not affect the substance of the invention.

What is claimed is:

1. An FEC (Forward error correction) mechanism based on media content, wherein the FEC mechanism is implemented by using following method:

Method III: classifying the media content, and endowing it with the different importance; in the absence of a shunt for the original media data flow, dynamically adjusting the importance of frames contained in the media packet and the corresponding coding scheme according to a current channel condition; transmitting the data packets to the corresponding FEC encoder to conduct different degrees of protection; finally, encoding one source data flow as one FEC code stream;

wherein Method III comprises following sub-steps: generating MMTP flows and a signaling based on media resources; according to different importance of each frame of data in MMT flows, using FEC encoding matrix to perform the FEC coding and integrating the FEC codes; returning corresponding repair characters, an FEC data load identification and an original data load identification; packaging all the repair characters into an FEC repair packet and sending to the transport layer.

2. The FEC mechanism based on the media content according to claim 1, wherein the method III comprises steps of adding the unequal error protection flag bit in the signaling information transmitted together with the media processing unit (MPU), and adding special instruction fields to form more personalized protection schemes.

3. The FEC mechanism based on the media content according to claim 1, wherein

Method III: classifying the media content and endowing the media content with the different importance; then controlling by a signaling and a indicating bit; coding by using FEC coding strengths.

4. The FEC mechanism based on the media content according to claim 1, wherein Method III: for the architecture of MMT AL-FEC sending end, a flow method of the sending end comprises steps of:
   a) Generating MMTP flows and a signaling by the server based on media resources;
   b) According to the different importance of each frame of data in MMT flows, transmitting MMT packets to FEC encoders; for different priorities, using FEC encoding matrices to perform the FEC coding of MMT packets, to generate corresponding FEC codes;
   c) Integrating FEC codes formed after performing the FEC coding of MMT packets with different priorities in a same data flow in a previous step, to generate an FEC code stream;
   d) After FEC coding is completed, returning a corresponding repair characters, an FEC data load identification and an original data load identification; and
   e) Packaging all the repair characters into an FEC repair packet and sending to the transport layer.

5. The FEC mechanism based on the media content according to claim 4, wherein the method III comprises a step of identifying FEC flows, an FEC coding structure used and an FEC code by the signaling; to support the mechanism, the fec_flow_descriptor field in the signaling is modified: a new fec_coding_structure is added based on current three kinds of fec_coding_structure fields in an AL-FEC message; a function of the fec_coding_structure is to describe a currently used FEC coding scheme, including a selected coding algorithm, whether to use a private coding scheme, a maximum protection time window time and value, etc.; a field is located in an AL-FEC signaling and is transmitted to the receiving end; the flag bit of the newly added fec_coding_structure is selected within a range of an existing reserved;

an original signaling only supports a repair information of one FEC flow multiplexing multiple media resources; the parts with different importance of one media resource is added now; the FEC signaling is respectively controlled to refine the FEC mechanism; the server is able to dynamically adjust the FEC strength of different parts of the media resource according to a user network status, to achieve a balance point between a network bandwidth and the user experience.

* * * * *